(12) United States Patent
Zhang et al.

(10) Patent No.: US 12,489,618 B2
(45) Date of Patent: Dec. 2, 2025

(54) SECURITY MANAGEMENT SYSTEM AND SECURITY MANAGEMENT METHOD

(71) Applicant: BOE TECHNOLOGY GROUP CO., LTD., Beijing (CN)

(72) Inventors: Yang Zhang, Beijing (CN); Han Li, Beijing (CN); Jiuxia Yang, Beijing (CN); Mingyuan Ma, Beijing (CN); Jiashuang Zong, Beijing (CN); Yuhai Sun, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/293,677

(22) PCT Filed: Aug. 30, 2022

(86) PCT No.: PCT/CN2022/115847
§ 371 (c)(1),
(2) Date: Jan. 30, 2024

(87) PCT Pub. No.: WO2024/044965
PCT Pub. Date: Mar. 7, 2024

(65) Prior Publication Data
US 2025/0007703 A1    Jan. 2, 2025

(51) Int. Cl.
*H04L 9/08* (2006.01)
*H04L 9/14* (2006.01)
*H04L 9/32* (2006.01)

(52) U.S. Cl.
CPC ............. *H04L 9/0866* (2013.01); *H04L 9/14* (2013.01); *H04L 9/3234* (2013.01)

(58) Field of Classification Search
CPC ....... H04L 9/0866; H04L 9/14; H04L 9/3234; H04L 9/08; H04L 9/32; H04L 9/40; H04W 12/04; H04W 12/06
See application file for complete search history.

(56) References Cited

U.S. PATENT DOCUMENTS

2019/0289135 A1    9/2019  Stolze et al.
2021/0185018 A1 *  6/2021  Soman ................ H04L 63/0236

FOREIGN PATENT DOCUMENTS

| CN | 102685749 A | 9/2012 |
|---|---|---|
| CN | 103906052 A | 7/2014 |
| CN | 105245532 A | 1/2016 |
| CN | 105610667 A | 5/2016 |
| CN | 106101068 A | 11/2016 |
| CN | 107332803 A | 11/2017 |
| CN | 110289973 A | 9/2019 |
| CN | 111464486 A | 7/2020 |
| CN | 111835752 A | 10/2020 |

* cited by examiner

*Primary Examiner* — Izunna Okeke
(74) *Attorney, Agent, or Firm* — The Webb Law Firm

(57) ABSTRACT

A security management system includes a first server. The first server is configured to: obtain access information of a terminal device; generate, if the access information of the terminal device meets an access condition, a first key based on a registration time of the terminal device, identification information of the terminal device, and fingerprint information of the terminal device; encrypt the first key using a second key, the first key being different from the second key; and send the encrypted first key to the terminal device, so that the terminal device decrypts the encrypted first key using the second key.

18 Claims, 5 Drawing Sheets

SECURITY MANAGEMENT SYSTEM AND SECURITY MANAGEMENT METHOD

CROSS-REFERENCE TO RELATED APPLICATION

The application is the United States national phase of International Application No. PCT/CN2022/115847 filed Aug. 30, 2022, the disclosure of which is hereby incorporated by reference in its entirety.

BACKGROUND OF THE INVENTION

Field of the Invention

The present disclosure relates to the field of security, and in particular, to a security management system and a security management method.

Description of Related Art

In the construction of bank smart outlets, mobile terminals need to access to the intranet of the bank to access corresponding bank application services. Since the intranet of the bank cannot provide wireless network delivery, the mobile terminal needs to access to the intranet of the bank through the Internet. However, there are certain security risks when mobile terminals access to the intranet of the bank through the Internet.

SUMMARY OF THE INVENTION

In an aspect, a security management system is provided. The security management system includes a first server. The first server is configured to: obtain access information of a terminal device; generate, if the access information of the terminal device meets an access condition, a first key based on a registration time of the terminal device, identification information of the terminal device and fingerprint information of the terminal device; the fingerprint information being related to a time when an application is installed on the terminal device; encrypt the first key using a second key to obtain an encrypted first key, the first key being different from the second key; and send the encrypted first key to the terminal device, so that the terminal device decrypts the encrypted first key using the second key.

In some embodiments, the security management system further includes a gateway. The gateway is configured to: receive an access request from a second server, the second server being a server of a supplier, the access request including access information, the access information being encrypted by the second server using a public key corresponding to the supplier, and the access information including identification information of the second server and an access request time; decrypt the access request using a private key corresponding to the supplier to obtain the access information; and send the access request to the first server corresponding to the supplier based on the access information; the access information further including an application serial number of an application service provided by the supplier through the second server, and the application service being deployed on the first server; the first server corresponding to the supplier being determined based on the application serial number.

In some embodiments, the gateway is further configured to: receive an encrypted access request sent from the terminal device, the encrypted access request including first encrypted information and second encrypted information; decrypt the first encrypted information using a private key corresponding to the public key to obtain first information; and send the second encrypted information to the first server based on the first information. The first server is further configured to: receive the second encrypted information; and decrypt the second encrypted information using the first key to obtain the second information. The first encrypted information is obtained by the terminal device encrypting the first information in the access request using the public key, and the second encrypted information is obtained by the terminal device encrypting the second information in the access request using the first key.

In some embodiments, in the security management system, the first server is further configured to: obtain and store the identification information and registration information of the terminal device; the identification information of the terminal device includes a media access control address and/or an international mobile equipment identity of the terminal device, and the registration information of the terminal device includes the fingerprint information of the terminal device. The access information of the terminal device meeting the access condition includes: registration information of at least one terminal device stored in the first server including fingerprint information that is the same as the fingerprint information in the access information of the terminal device.

In some embodiments, in the security management system, the first server is further configured to: send response information to the terminal device, the response information being used to indicate that the access information of the terminal device meets the access condition; receive a key request from the terminal device, the key request being used to request the first key. The registration time of the terminal device is related to a time when the terminal device sends the key request.

In some embodiments, the security management system further includes the terminal device, and the terminal device is configured to: send the access information to the first server; receive the encrypted first key; and decrypt the encrypted first key using the second key to obtain the first key. The second key is generated through a hash algorithm based on first salt information, the fingerprint information of the terminal device, and the registration time of the terminal device.

In some embodiments, the terminal device is further configured to: resend, if the application is reinstalled on the terminal device or an operation system of the terminal device is reinstalled, the access information to the first server.

In some embodiments, in the security management system, the terminal device is further configured to: generate a third key through a hash operation based on the fingerprint information of the terminal device and second salt information; encrypt the first key using the third key; and store the encrypted first key.

In some embodiments, in the security management system, the terminal device is further configured to: generate the fingerprint information of the terminal device through a hash algorithm based on at least one of the identification information of the terminal device, hardware information of the terminal device, information of the application installed on the terminal device, and the time when the application is installed on the terminal device.

In some embodiments, in the security management system, the first server is further configured to add the terminal device to a blacklist in a case where a number of abnormal accesses of the terminal device is greater than or equal to a threshold. The abnormal access includes that the access information of the terminal device does not meet the access condition.

In another aspect, a security management method is provided. The security management method includes: obtaining, by a first server, access information of a terminal device; generating, by the first server, a first key based on a registration time of the terminal device, identification information of the terminal device, and fingerprint information of the terminal device if the access information of the terminal device meets an access condition, the fingerprint information being related to a time when an application is installed on the terminal device; encrypting, by the first server, the first key using a second key to obtain an encrypted first key, the first key being different from the second key; and sending, by the first server, the encrypted first key to the terminal device, so that the terminal device decrypts the encrypted first key using the second key.

In some embodiments, the security management method further includes: receiving, by a gateway, an access request from a second server, the second server being a server of a supplier, the access request including access information, the access information being encrypted by the second server using a public key corresponding to the supplier, and the access information including identification information of the second server and an access request time; decrypting, by the gateway, the access request using a private key corresponding to the supplier to obtain the access information; and sending, by the gateway, the access request to the first server corresponding to the supplier based on the access information; the access information further including an application serial number of an application service provided by the supplier through the second server, and the application service being deployed on the first server; the first server corresponding to the supplier being determined based on the application serial number.

In some embodiments, the security management method further includes: receiving, by the gateway, an encrypted access request sent from the terminal device, the encrypted access request including first encrypted information and second encrypted information; decrypting, by the gateway, the first encrypted information using a private key corresponding to the public key to obtain first information; sending, by the gateway, the second encrypted information to the first server based on the first information; receiving, by the first server, the second encrypted information; and decrypting, by the first server, the second encrypted information using the first key to obtain second information. The first encrypted information is obtained by the terminal device encrypting the first information in the access request using the public key, and the second encrypted information is obtained by the terminal device encrypting the second information in the access request using the first key.

In some embodiments, the security management method further includes: obtaining and storing, by the first server, the identification information and registration information of the terminal device. The identification information of the terminal device includes a media access control address and/or an international mobile equipment identity of the terminal device, and the registration information of the terminal device includes the fingerprint information of the terminal device. The access information of the terminal device meeting the access condition includes: registration information of at least one terminal device stored in the first server including fingerprint information that is the same as the fingerprint information in the access information of the terminal device.

In some embodiments, the security management method further includes: sending, by the first server, response information to the terminal device; the response information being used to indicate that the access information of the terminal device meets the access condition; and receiving, by the first server, a key request from the terminal device, the key request being used to request the first key. The registration time of the terminal device is related to a time when the terminal device sends the key request.

In some embodiments, the security management method further includes: sending, by the terminal device, the access information to the first server; receiving, by the terminal device, the encrypted first key; and decrypting, by the terminal device, the encrypted first key using the second key to obtain the first key. The second key is generated through a hash algorithm based on first salt information, the fingerprint information of the terminal device, and the registration time of the terminal device.

In some embodiments, the security management method further includes: resending, by the terminal device, the access information to the first server if the application is reinstalled on the terminal device or an operation system of the terminal device is reinstalled.

In some embodiments, the security management method further includes: generating, by the terminal device, a third key through a hash algorithm based on the fingerprint information and second salt information of the terminal device; encrypting, by the terminal device, the first key using the third key; and storing, by the terminal device, the encrypted first key.

In some embodiments, the security management method further includes: generating, by the terminal device, the fingerprint information of the terminal device through a hash algorithm based on at least one of the identification information of the terminal device, hardware information of the terminal device, information of the application installed on the terminal device, or the time when the application is installed on the terminal device.

In yet another aspect, a non-transitory computer-readable storage medium is provided. The non-transitory computer-readable storage medium has stored computer program instructions that, when executed on a computer (e.g., a security management system), cause the computer to perform the security management method according to any one of the above embodiments.

In yet another aspect, a computer program product is provided. The computer program product includes computer program instructions; the computer program instructions, when executed on a computer (e.g., a security management system), cause the computer to perform the security management method according to any one of the above embodiments.

In yet another aspect, a computer program is provided. When executed on a computer (e.g., a security management system), the computer program causes the computer to perform the security management method according to any one of the above embodiments.

BRIEF DESCRIPTION OF THE DRAWINGS

In order to describe technical solutions in the present disclosure more clearly, the accompanying drawings to be used in some embodiments of the present disclosure will be introduced briefly. Obviously, the accompanying drawings to be described below are merely drawings of some embodiments of the present disclosure, and a person of ordinary skill in the art can obtain other drawings according to those drawings. In addition, the accompanying drawings in the following description may be regarded as schematic diagrams, but are not limitations on actual sizes of products, actual processes of methods and actual timings of signals involved in the embodiments of the present disclosure.

DESCRIPTION OF THE INVENTION

Figure 1:
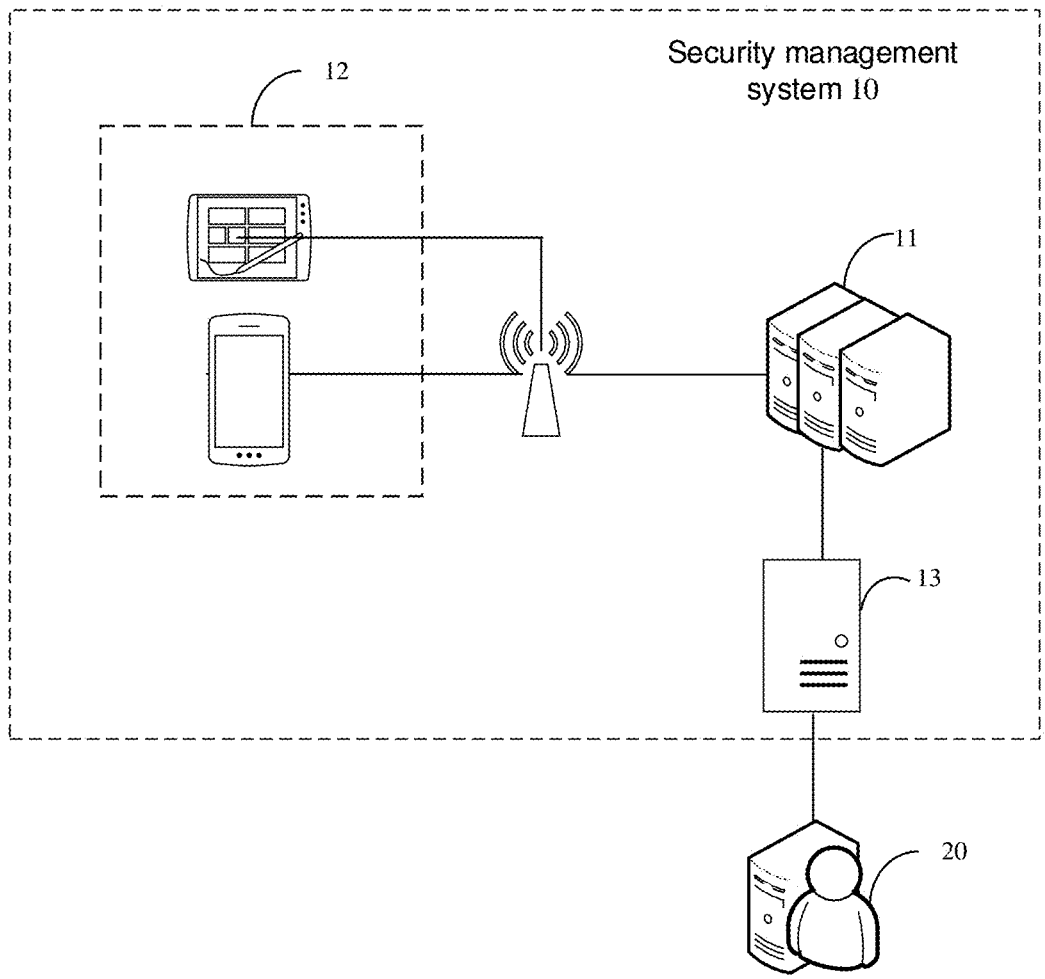
FIG. 1 is a schematic diagram of a security management system, in accordance with some embodiments.

The technical solutions in some embodiments of the present disclosure will be described clearly and completely with reference to the accompanying drawings; obviously, the described embodiments are merely some but not all of embodiments of the present disclosure. All other embodiments obtained on a basis of the embodiments of the present disclosure by a person of ordinary skill in the art shall be included in the protection scope of the present disclosure.

Unless the context requires otherwise, throughout the description and claims, the term "comprise" and other forms thereof such as the third-person singular form "comprises" and the present participle form "comprising" are construed as an open and inclusive meaning, i.e., "included, but not limited to". In the description of the specification, terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, specific features, structures, materials or characteristics may be included in any one or more embodiments or examples in any suitable manner.

Hereinafter, the terms "first" and "second" are only used for descriptive purposes, and are not to be construed as indicating or implying relative importance or implicitly indicating the number of indicated technical features. Thus, a feature defined with "first" or "second" may explicitly or implicitly include one or more features. In the description of the embodiments of the present disclosure, "a/the plurality of" means two or more unless otherwise specified.

Some embodiments may be described using the expressions "coupled" and "connected" along with their derivatives. For example, the term "connected" may be used in the description of some embodiments to indicate that two or more components are in direct physical or electrical contact with each other. As another example, the term "connected" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the context herein.

The phrase "at least one of A, B, and C" has a same meaning as the phrase "at least one of A, B, or C", and both include the following combinations of A, B, and C: only A, only B, only C, a combination of A and B, a combination of A and C, a combination of B and C, and a combination of A, B, and C.

The phrase "A and/or B" includes following three combinations: only A, only B, and a combination of A and B.

As used herein, the term "if" is, optionally, construed to mean "when" or "upon" or "in response to determining" or "in response to detecting", depending on the context. Similarly, depending on the context, the phrase "if it is determined" or "if [a stated condition or event] is detected" is optionally construed as "in a case where it is determined", "in response to determining", "in a case where [the stated condition or event] is detected", or "in response to detecting [the stated condition or event]".

The use of the phase "applicable to" or "configured to" herein means an open and inclusive language, which does not exclude devices that are applicable to or configured to perform additional tasks or steps.

Additionally, the use of the phase "based on" is meant to be open and inclusive, since a process, step, calculation or other action that is "based on" one or more of the stated conditions or values may, in practice, be based on additional conditions or value beyond those stated.

With the construction of bank smart branches, bank branches are providing more and more application services for terminal devices. The terminal device needs to access to the intranet of the bank through wireless network access, but the intranet of the bank cannot provide the wireless network. Therefore, the mobile terminal accesses to the intranet of the bank through the Internet to access the related application services, which poses a challenge to the security of the intranet of the bank. At present, in the solutions for the terminal device accessing to the intranet of the bank through the Internet, most of them only consider the security protection of the data transmission process, and do not consider the security of the entire link, which poses certain security risks during the process of terminal devices accessing to the intranet of the bank.

To this end, some embodiments of the present disclosure provide a full-link secure access solution that provides security protection for the processes such as terminal device access, information interaction between the terminal device and the intranet of the bank, and information interaction between the vendor and the intranet of the bank, so as to strengthen the security control of the intranet of the bank.

FIG. 1 is a schematic diagram of a security management system, in accordance with some embodiments of the present disclosure. As shown in FIG. 1, the security management system 10 includes first server(s) 11.

The first server 11 is a server deployed in an internal network environment (also referred to as an intranet). The internal network environment may be a network environment deployed in any area, and the embodiments of the present disclosure are illustrated by considering an intranet of a bank as an example. For example, the first server 11 may be a server deployed in the intranet of the bank, and various applications (APPs) may be deployed on the first server 11.

There may be one or more first servers 11; the first server 11 may be a physical server or a virtual server, and the type and the number of the first servers 11 will not be limited in the embodiment of the present disclosure.

In some embodiments, as shown in FIG. 1, the security management system 10 further includes a terminal device 12.

The terminal device 12 includes, for example, a mobile phone, a notebook computer, a tablet computer (e.g., a PAD device), and a smart wearable device (e.g., a watch). There may be one or more terminal devices 12, and the type and the number of terminal devices 12 accessing to the intranet of the bank will not be limited in the embodiments of the present disclosure.

After accessing to the intranet of the bank, the terminal device 12 may access the application services deployed on the first server 11. For example, after the PAD accessing to the intranet of the bank, users (e.g., bank managers) may conduct relevant business processing or information inquiries through the relevant APPs installed on the PAD.

In some embodiments, the terminal device 12 is configured to send a registration request to the first server 11; the registration request includes registration information.

The first server is configured to receive the registration request from the terminal device 12.

In some embodiments, the first server 11 is further configured to obtain and store identification information and registration information of the terminal device 12.

For example, the identification information of the terminal device 12 is information that may uniquely identify the terminal device 12; the identification information of the terminal device 12 includes, but is not limited to, media access control address (MAC) of the terminal device 12 and/or international mobile equipment identity (IMEI).

Obtaining the identification information of the terminal device 12 by the first server 11 includes entering the identification information of the terminal device 12 by the first server 11. After obtaining the identification information of the terminal device 12, the first server 11 stores the identification information.

Figure 2:
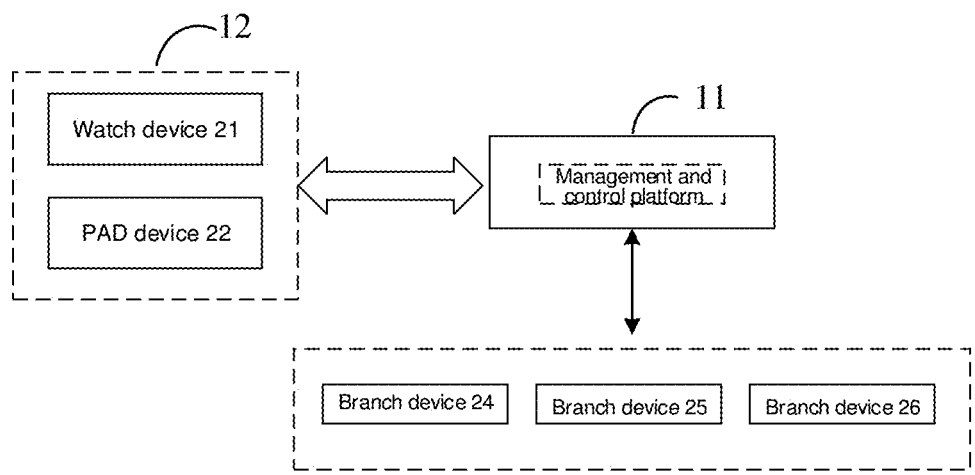
FIG. 2 is a schematic diagram of another security management system, in accordance with some embodiments.

As shown in FIG. 2, a management and control platform 23 is deployed on the first server 11 of the intranet of the bank; the management and control platform 23 is used to manage the process of accessing to the first server 11 by the terminal device 12 (for example, including a watch device 21 and a PAD device 22). The management and control platform 23 is further used to manage bank branch devices, such as a branch device 24, branch device 25, and branch device 26. Before the terminal device 12 accesses to the first server 11, the identification information of the terminal device 12 may be entered into the management and control platform 23. For example, the identification information of the terminal device 12 may be entered manually. After the identification information of the terminal device 12 is entered into the management and control platform 23, the first server 11 stores the identification information of the terminal device 12.

After completing the entry of the identification information of the terminal device 12, the terminal device 12 may perform device registration. Only the terminal device 12 that has completed device registration has the authority to access to the first server 11. For example, the prerequisite for the terminal device 12 to perform device registration is that the identification information of the terminal device 12 is stored in the first server 11.

It will be noted that before performing device registration, the terminal device 12 needs to download and install the relevant APP in advance. Considering the android application package (APK) as an example, the user downloads and installs the APK on the terminal device 12, then, the terminal device 12 will check its network access status to check whether the terminal device 12 has accessed to the first server 11. If the check result is that the terminal device 12 has not yet accessed to the first server 11, then the terminal device 12 continues to complete the device registration process.

The terminal device 12 may perform the device registration at any time after the identification information is entered, for example, may be performed immediately after the identification information is entered, or may be performed after a period of time after the identification information is entered.

Figure 3:
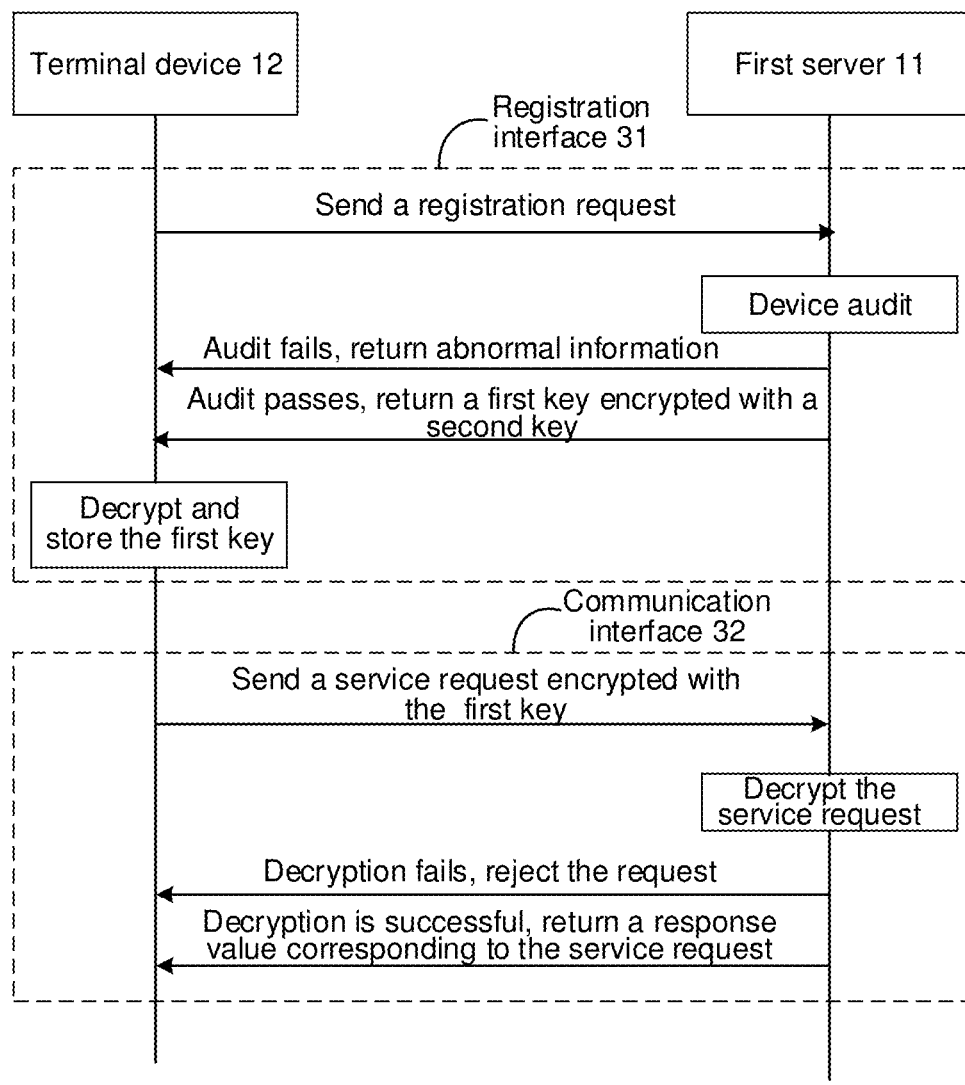
FIG. 3 is a schematic diagram showing information interaction of a security management system, in accordance with some embodiments.

Performing the device registration by the terminal device 12 includes sending a registration request to the first server 11 by the terminal device 12. As shown in FIG. 3, the terminal device 12 sends a registration request to the first server 11 by calling a registration interface 31, the registration request including the registration information.

For example, the registration information of the terminal device 12 includes the identification information of the terminal device 12, fingerprint information of the terminal device 12, and version information of the APP installed on the terminal device 12.

After the terminal device 12 sends the registration request to the first server 11, the first server 11 receives the registration request and obtains the registration information of the terminal device 12 at the same time. Since the registration information includes the identification information of the terminal device 12, after obtaining the identification information of the terminal device 12 that sent the registration request, the first server 11 verifies whether the identification information is stored in the first server 11. That is, the first server 11 needs to verify whether the terminal device 12 that sends the registration request is the terminal device 12 that has completed the entry of the identification information. If the first server 11 stores the identification information of the terminal device 12 that sent the registration request, which indicates that the terminal device 12 is a registered terminal device. In this case, the terminal device 12 has the authority to continue to perform the device registration.

If the first server 11 stores the identification information of the terminal device 12 that sent the registration request, the first server 11 stores the obtained registration information of the terminal device 12. As shown in FIG. 2, the management and control platform 23 updates the received registration information of the terminal device 12 to the information of the terminal device 12 in the first server 11. That is, in this case, the identification information, fingerprint information, and the like corresponding to the terminal device 12 are stored in the first server 11.

In some embodiments, the fingerprint information of the terminal device 12 is obtained based on the identification information of the terminal device 12, the hardware information of the terminal device 12, the information of the APP installed on the terminal device 12, and the time when the APP is installed on the terminal device 12 by using the hash algorithm.

It will be noted that the hardware information of the terminal device 12 may be information that is not easily changed of the terminal device 12, such as device model information, and storage space information of the terminal device 12. The time when the APP is installed on the terminal device 12 includes the time when the APP is installed on the terminal device 12 for the first time, or the time when the APP is reinstalled on the terminal device 12. For example, when the APP is uninstalled and reinstalled on the terminal device 12, the information of the APP installed on the terminal device 12 and the time when the APP is installed are changed, so that the fingerprint information of the terminal device 12 will also change. In this case, the terminal device 12 will resend a new registration request to the first server 11, and the first server 11 will reobtain the new registration information of the terminal device 12, and the new registration information includes the new fingerprint information.

For example, the hash algorithm in the embodiments of the present disclosure may adopt the message-digest 5 (MD 5) algorithm or other hash algorithms, such as the SHA 1 algorithm, SHA 256 algorithm, and the type the hash algorithm is not limited in the embodiments of the present disclosure.

After the verification result for the identification information of the terminal device 12 by the first server 11 is yes, and the registration information of the terminal device is obtained by the first server 11, the terminal device 12 may start to access to the first server 11.

The first server 11 is further configured to: obtain access information of the terminal device 12; determine whether the access information of the terminal device 12 meets an access condition; and if the access information of the terminal device 12 meets the access condition, generate a first key based on the registration time of the terminal device 12, the identification information of the terminal device 12, and the fingerprint information of the terminal device 12.

In some embodiments, the access information of the terminal device 12 meeting the access condition includes: the registration information of at least one terminal device stored in the first server 11 including fingerprint information the same as the fingerprint information in the access information of the terminal device 12.

When the terminal device 12 accesses to the first server 11 for the first time, the first server 11 will perform a device audit on the terminal device 12. The manner of auditing the terminal device 12 by the first server 11 is not limited in the embodiments of the present disclosure. For example, manual review may be used, or system automatic review may be used. For example, the device audit of the terminal device 12 by the first server 11 includes: checking whether the access information of the terminal device 12 meets the access condition. If the access condition is met, the audit passes, otherwise the audit fails.

It will be noted that in a case where the access information of the terminal device 12 is that the terminal device 12 accesses to the first server 11, the access information of the terminal device 12 is sent to the first server 11; the access information may include identification information and fingerprint information of the terminal device to be accessed 12. After receiving the access information of the terminal device to be accessed 12, the first server 11 determines whether the terminal device to be accessed 12 is a terminal device stored in the first server 11 based on the access information.

Since the first server 11 stores the registration information of one or more terminal devices that have completed the entry of identification information, the first server 11 may determine whether the terminal device to be accessed 12 has the authority to access to the first server 11 by checking whether the fingerprint information stored in the first server 11 includes the fingerprint information in the access information of the terminal device to be accessed 12. If the fingerprint information in the registration information stored in the first server 11 includes the fingerprint information in the access information of the terminal device 12, then the access information of the terminal device 12 meets the access condition and the terminal device 12 may access to the first server 11; on the contrary, the access information of the terminal device 12 does not meet the access condition, and thus the terminal device 12 cannot access to the first server 11.

As shown in FIG. 2, in a case where the watch device 21 accesses to the first server 11, the access information of the watch device 21 (including the fingerprint information of the watch device 21) may be observed on the management and control platform 23, and the administrator may check (or the system automatically checks) whether the fingerprint information matches the fingerprint information stored in the first server 11. If the fingerprint information in the access information of the watch device 21 successfully matches the fingerprint information stored in the first server 11, the audit passes and the watch device 21 successfully accesses to the first server 11. If the fingerprint information in the access information of the watch device 21 does not successfully match the fingerprint information stored in the first server 11, the audit fails and the watch device 21 cannot access to the first server 11.

As shown in FIG. 3, after the terminal device 12 sends the registration request to the first server 11 by calling the registration interface 31, the first server 11 receives the registration request and performs the device audit on the terminal device 12. The results of the device audit include audit passing and audit failing. Only the terminal device 12 that passes the audit may access to the first server 11. If the audit fails, the first server 11 returns abnormal information to the terminal device 12.

In some embodiments, the terminal device 12 is further configured to: resend, if the applications are reinstalled on the terminal device 12 or an operation system of the terminal device 12 is reinstalled, the access information to the first server 11.

For example, after being successfully registered, the terminal device 12 cannot directly perform the repeated registration. After the APK is reinstalled on the terminal device 12 or operations such as reinstalling operation system of the terminal device 12 are performed, the terminal device 12 will resend a registration request to the first server 11 to reregister the device. In this case, the first server 11 will reverify the registration request of the terminal device 12 and reaudit the access information resent by the terminal device 12. When the terminal device 12 sends the registration request, the first server 11 first checks the registration status of the terminal device 12; if the registration status of the terminal device 12 is registered, the first server 11 needs to clear the registration status of the terminal device 12 before auditing, for example, change the registration status to be unregistered. Thus, the terminal device 12 is able to re-register and access to the first server 11.

The first server 11 is further configured to send response information to the terminal device 12; the response information is used to indicate that the access information of the terminal device 12 meets the access condition.

The terminal device 12 is further configured to receive the response information from the first server 11, and send a key request to the first server 11; the key request is used to request the first key. For example, the first key is a key used to encrypt communication messages during communication between the terminal device 12 and the first server 11.

The first server 11 is further configured to receive the key request from the terminal device 12; the key request is used to request the first key.

After the terminal device 12 passes the device audit, the first server 11 will send the response information to the terminal device 12 to indicate that the terminal device 12 has accessed to the first server 11. After receiving the response information sent by the first server 11, the terminal device 12 sends the key request to the first server 11 to request the first key for encrypting the communication message.

After receiving the key request sent by the terminal device 12, the first server 11 generates the first key based on the registration time of the terminal device 12, the identification information of the terminal device 12, and the fingerprint information of the terminal device 12.

In some embodiments, the registration time of the terminal device 12 is related to the time when the terminal device 12 sends the key request to the first server 11.

For example, the registration time of the terminal device 12 may be the time when the terminal device 12 sends the key request to the first server 11; alternatively, the registration time of the terminal device 12 may be the time when the first server 11 receives the key request sent by the terminal device 12. The registration time of the terminal device 12 is determined based on the time when the first server 11 sends the key request, which may ensure that the terminal device 12 has successfully accessed to the first server 11 at the registration time.

For example, the first server 11 performs the hash algorithm to obtain the first key based on the MAC address or IMEI of the terminal device 12, the fingerprint information of the terminal device 12, the registration time of the terminal device 12, and the audit information (e.g., auditor information, and audit time) of the terminal device 12. Generation factors of the first key include the fingerprint information and registration time of the terminal device 12. That is, the generation mechanism of the first key is related to both the fingerprint information of the terminal device 12 and the time factor. Therefore, it is difficult to be imitated and broke afterwards. That is to say, for each terminal device 12, the first server 11 will generate a unique first key to implement a one-machine-one-key dynamic distribution mechanism.

After generating the first key, the first server 11 stores the first key and sends the first key to the terminal device 12, so that the first key is used for encryption and decryption during the communication between the first server 11 and the terminal device 12, so as to achieve the encryption mechanism of symmetric encryption.

The first server 11 is further configured to encrypt the first key using a second key.

In order to ensure the security of the process of the first server 11 sending the first key to the terminal device 12, the first server 11 encrypts the first key using the second key, and sends the encrypted first key to the terminal device 12, thereby ensuring the security and reliability of the sending process of the first key.

When sending the first key, the first server 11 first dynamically generates the second key, then encrypts the first key using the second key, and sends the encrypted first key to the terminal device 12. Since the second key will only be used when the first server 11 sends the first key, in some examples, after sending of the first key, the first server 11 will not store the second key.

For example, the first server 11 generates the second key by using a salt encryption algorithm. For example, the first server 11 may perform the hash algorithm on first salt information, the fingerprint information of the terminal device 12 and the registration time of the terminal device 12 to obtain the second key. The first salt information may be a set of character strings stored in the first server 11, or a set of character strings temporarily generated by the first server 11, and the specific content of the first salt information is not limited in the present disclosure. The generation information of the second key further include the MAC address of the terminal device, ownership information of the terminal device 12, a serial number ID of the APP installed on the terminal device 12, and the like. For example, the ownership information of the terminal device 12 includes information of a region to which the terminal device 12 belongs, information of a user to which the terminal device 12 belongs, or the like.

In some embodiments, the second key is different from the first key. For example, the generation factors of the first key are different from the generation factors of the second key are different, so that the second key is different from the first key. For another example, the generation factors of the second key include salt information, and the generation factors of the first key do not include salt information, so that the second key is different from the first key. For yet another example, the generation factors of the first key and the generation factors of the second key both include salt information, but the two salt information are different, so that the second key is different from the first key. For example, after generating the second key, if it is found that the second key is the same as the first key, the first server 11 may regenerate the second key.

The first server 11 is further configured to send the encrypted first key to the terminal device 12, so that the terminal device 12 decrypts the encrypted first key using the second key.

As shown in FIG. 3, when the terminal device 12 passes the device audit, the first server 11 will return the first key encrypted with the second key to the terminal device 12, and the terminal device 12 receives the encrypted first key, and then decrypts and stores the first key.

For example, the terminal device 12 receives the encrypted first key and decrypts the encrypted first key using the second key to obtain the first key. As an implementation, the terminal device 12 generates the second key using the same generation mechanism as that of the first server 11, thereby achieving a symmetric encryption mechanism between the terminal device 12 and the first server 11 to improve the encryption efficiency. The same mechanism as the first server 11 generating the second key, the terminal device 12 may also obtain the second key by using the hash algorithm based on the first salt information, the fingerprint information of the terminal device 12, and the registration time of the terminal device 12, so as to ensure the consistency of the second key. It will be noted that the first salt information of the terminal device 12 may be the first salt information sent to the terminal device 12 by the first server 11 (for example, the first server 11 may encrypt the first salt value information and then send it to the terminal device 12), or may be the first salt information generated by the terminal device 12 by using the same generation mechanism as that of the first server 11.

After obtaining the first key by decrypting the second key, the terminal device 12 needs to store the first key for use in encrypting the service request during subsequent business communications with the first server 11.

As shown in FIG. 3, the terminal device 12 sends a service request encrypted with a first key to the first server 11 by calling the communication interface 32, and the first server 11 receives the encrypted service request and decrypt the service request using the first key; if the decryption is successful, the first server 11 returns a response value corresponding to the service request to the terminal device 12; if the decryption fails, the first server 11 rejects the service request of the terminal device 12.

In order to further improve the security of the terminal device 12 locally storing the first key, in some embodiments, the terminal device 12 is further configured to: generate a third key based on the fingerprint information of the terminal device 12 by using the salt value algorithm; encrypt the first key using the third key; and store the encrypted first key.

For example, the terminal device 12 may perform the hash algorithm on second salt information and the fingerprint information of the terminal device 12 to obtain the third key. The second salt information may be a set of character strings stored in the terminal device 12, or a set of character strings temporarily generated by the terminal device 12. The second salt information is different from the first salt information.

As an implementation, the generation information of the third key further includes the MAC address of the terminal device, ownership information of the terminal device 12, a serial number ID of the APP installed on the terminal device 12, and the like. The third key may also be generated by other valid encryption strategies.

The terminal device 12 encrypts and stores the first key using the generated third key, thereby ensuring the storage security of the first key. In a case where the terminal device 12 needs to call the first key, the same generation mechanism is used to generate the third key for decryption, thereby achieving the symmetry of the third key. For example, after generating the second salt value information, the terminal device 12 stores the second salt information; and in a case where the first key needs to be called, the third key is obtained based on the second salt information for decryption. Alternatively, the terminal device 12 may generate the same second salt information again by using the same generation mechanism; in a case where the first key needs to be called, the third key is obtained based on the second salt information, thereby ensuring the consistency of the third key.

In order to further ensure the storage security of the first key, the terminal device 12 may replace the second salt information after a preset time, thereby ensuring the dynamic management for the third key. For example, the terminal device 12 regenerates the second salt information every other month, and then regenerates the third key, and encrypt and store the first key using the new third key. For another example, the terminal device 12 may regenerate the second salt information from time to time, and then regenerates the third key, and encrypt and store the first key using the new third key.

In some embodiments, the terminal device 12 is further configured to provide security protection for applications installed on the terminal device 12 by using a packer technology.

For the security protection of program itself of the APP installed on the terminal device 12, in the embodiments of the present disclosure, it is possible to protect the program source code of the terminal device 12 by using the packer technology of android, so as to further strengthen the security protection of the terminal device 12. For example, it is possible to wrap another piece of code outside the APP program to protect the core code inside from being illegally modified. The wrapped another piece of code is not limited in the present disclosure.

In some embodiments, the first server 11 is further configured to add the terminal device 12 to a blacklist in a case where the number of abnormal accesses of the terminal device 11 is greater than or equal to a threshold; the abnormal access includes that the access information of the terminal device 12 does not meet the access condition.

For example, abnormally accessing, by the terminal device 11, to the first server 11 includes: sending, by the terminal device 12, registration requests to the first server 11 multiple times in succession, the access information each time does not meeting the access condition; and continuously calling, by the terminal device 12, the interface of the first server 11 abnormally in a case where the terminal device 12 has accessed to the first server 11 and during the process of communicating with the first server 11. In this case, if the number of abnormal accesses exceeds the threshold, the first server 11 will limit the access request of the terminal device 12. The threshold may be set according to requirements, and will not be limited in the embodiments of the present disclosure. For example, the threshold is 5, in a case where the access interface of the first server 11 is continuously abnormally called by the terminal device 12 for more than 5 times, the first server 11 will add the terminal device 12 to the blacklist. In this case, the terminal device 12 cannot access the first server 11 again. If the terminal device needs to access the first server 11 again, it needs to be registered again. By means of the abnormal monitoring, it is possible to prevent attackers from attacking the first server 11 in a trial and error manner.

In some embodiments, the first server 11 may use a hypertext transfer protocol over secure socket layer (HTTPS) interface communication to strengthen the security of information transmission.

For example, when the terminal device 12 calls the interface of the first server 11, it needs to include a digital signature, and the first server 11 may verify the legitimacy of the terminal device 12 through the signature.

In summary, the security management system 10 provided by the embodiments of the present disclosure strictly controls the security of the process of the terminal device 12 accessing the first server 11, and performs device audit on the terminal device 12 through the fingerprint information of the terminal device 12, thereby strengthening security authentication and access authorization of the terminal device 12. Secondly, in the embodiments of the present disclosure, it is possible to provide the further security protection for the data transmission process between the terminal device 12 and the first server 11. Compared with the problems of low encryption efficiency and low security in the existing encryption process, the security management system 10 provided by the embodiments of the present disclosure uses a symmetric encryption mechanism (e.g., advanced encryption standard (AES) encryption) to achieve the sending of the first key between the terminal device 12 and the first server 11, the encryption of communication messages, and the encryption of the first key in the storing process, which has the characteristics of fast encryption speed and high security. Moreover, in the embodiments of the present disclosure, the access process of the terminal device 12 requires authorization; the process for each terminal device 12 to obtain the first key is dynamic and unique, and the generation mechanisms of the first key, the second key and the third key are all related to the time factor. Therefore, it is difficult to be imitated and broke afterwards, thereby ensuring the security of the security management system 10.

The application scenarios of the management system 10 will not be limited in the embodiment of the present disclosure, and the following will be described by considering a bank as an example. In generally, the key system of the first key, the second key and the third key is managed by the supplier that provides products and services to the bank. The bank generally restrict suppliers by means of code security scanning, code management or contract constraints, which is difficult to effectively manage and monitor supplier confidentiality management of keys.

To this end, the security management system 10 provided by the embodiments of the present disclosure further includes a gateway. As shown in FIG. 1, the gateway 13 may operate in a centralized manner and be uniformly controlled by the bank. The gateway 13 is used to manage and monitor the access requests sent by the supplier, and forward the screened access requests to the corresponding first server 11, thereby ensuring the security of the access process to the first server 11.

In some embodiments, the gateway 13 is configured to: receive an access request from the second server 20. The second server 20 is a server of the supplier. The access request includes access information. The second server 20 encrypts the access information using the public key corresponding to the supplier, and the access information includes identification information of the second server 20 and the access request time.

For example, the second server 20 is a server of the supplier; the supplier provides application services to the bank through the second server 20, and the application services are deployed on the first server 11 of the intranet of the bank. Different application services may be provided by different suppliers, or be provided by the same supplier. The same supplier may provide application services for banks through at least one second server 20, and the number of suppliers and the number of the second servers 20 are not limited in the embodiments of the present disclosure.

Figure 4:
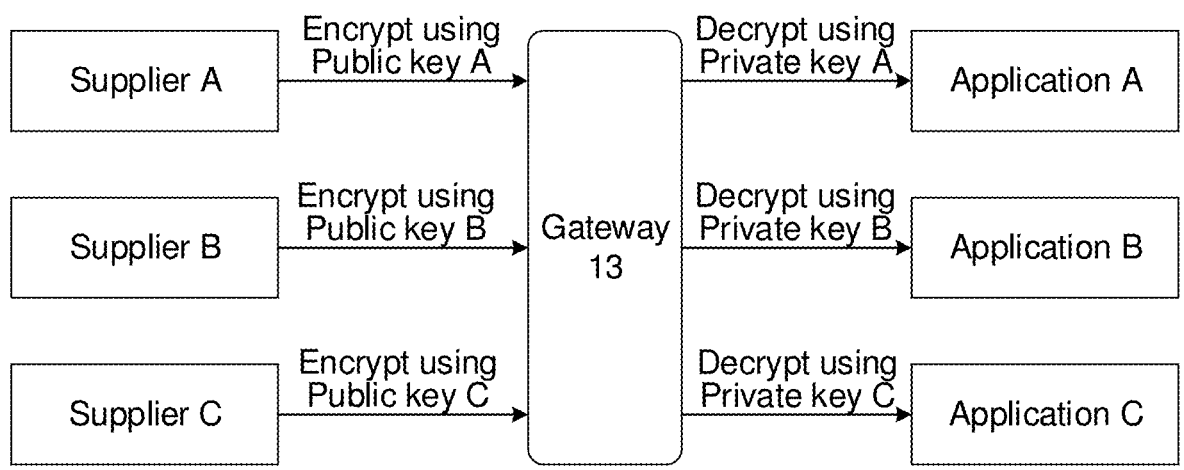
FIG. 4 is schematic diagram of a gateway encryption process, in accordance with some embodiments.

As shown in FIG. 4, for the application services of the intranet of the bank, Application A, Application B, and Application C are provided by Supplier A, Supplier B, and Supplier C respectively; Application A, Application B, and Application C may be deployed on the same first server 11, or may be deployed on different first servers 11 respectively. For example, applications provided by different suppliers may be deployed on different first servers 11 to achieve physical isolation between different suppliers.

In order to further improve the security of information interaction between the supplier and the gateway 13, asymmetric encryption may be used for information transmission between the second server 20 and the first server 11. The private key in the asymmetric encryption algorithm is controlled and managed by the bank, and the public keys are controlled by each supplier.

In some embodiments, the public keys corresponding to different suppliers are different, and different suppliers store the respective public keys. For example, the gateway 13 stores relevant information of the second server 20 of each supplier, and the information may include the private key information corresponding to the second server 20 and the identification information of the second server 20. The storage manner of the private key is not limited in the embodiments of the present disclosure. For example, the private key may be stored in an encrypted storage manner of the third key as in the above implementation. The gateway 13 may separately store the private key corresponding to each supplier to further ensure the security of the private keys of each supplier. As shown in FIG. 4, the public key of Supplier A is Public key A, the public key of Supplier B is Public key B, the public key of Supplier C is Public key C; Public key A, Public key B, Public key C corresponding to Private key A, Private key B, and Private key C are all managed and stored by the gateway 13.

The access request sent by the second server 20 to the first server 11 uniformly calls the gateway 13, and the access request includes access information. For example, the access information may include an APP serial number (serial ID) of the application service provided by the supplier, the access request time, and the identification information of the second server 20 (e.g., the MAC address of the second server 20), the second server 20 encrypts the access information using the public key, and sends the encrypted access request to the gateway 13. As shown in FIG. 4, Supplier A (i.e., the second server 20 corresponding to supplier A) encrypt the sent access request using Public key A, and then sends it to the gateway 13.

In some embodiments, the gateway 13 is further configured to decrypt the access request using the private key corresponding to the supplier to obtain the access information.

After receiving the access request sent by the second server 20, the gateway 13 decrypts the access request using the private key corresponding to the public key of the supplier to obtain the access information. For example, the access request sent by the second server 20 includes a device IMEI number of the second server 20, and the gateway 13 may store the private key according to the IMEI number of the second server 20. Then, when receiving the access request, the gateway 13 may find the corresponding private key according to the IMEI number, and thereby decrypt the access information in the access request. As shown in FIG. 4, after receiving the access request encrypted with Public key A sent by Supplier A, the gateway 13 decrypts the encrypted access request using the stored Private key A to obtain the access request, thereby obtaining the access information.

In some embodiments, the gateway 13 is further configured to send the access request to the first server 11 corresponding to the supplier based on the access information.

The access information includes the APP serial ID of the supplier, and the APP serial ID may determine the first server 11 corresponding to the application provided by the supplier. Therefore, the gateway 13 may forward the access request sent by the second server 20 to the corresponding first server 11 according to the APP serial ID. As shown in FIG. 4, the gateway 13 sends the access request decrypted using Private key A to Application A corresponding to Supplier A.

The gateway 13 may also control the access of the second server 20 based on information, such as the access request time and the MAC address of the second server 20. For example, it is determined that whether the second server 20 is in a normal access state by whether the gateway 13 decrypts the access request sent by the second server 20 using the private key corresponding to the second server 20. Alternatively, after the gateway 13 decrypting the message information, it is determined that whether the second server 20 is in a normal access state based on whether the device identifier in the access information is consistent with the device identifier of the second server 20 stored in the gateway 13. If the second server 20 is in a normal access state, the access request sent by the second server 20 is forwarded to the first server 11.

For example, the gateway 13 also monitors the number of abnormal accesses of the second server 20. For example, in a case where the number of consecutive abnormal accesses of the second server 20 is greater than or equal to a preset number of times, the gateway 13 prohibits the second server 20 from continuing to send the access request.

Therefore, the security management system 10 provided by the embodiments of the present disclosure may effectively control the content of access requests of the supplier, the number of requests, and the source of the requests, monitor and provide early warning for the access requests of the supplier, thereby effectively preventing the damage of security mechanism caused by improper management of the suppliers.

For example, the asymmetric encryption manner between the second server 20 and the gateway 13 may be used for business communication between the terminal device 12 and the first server 11. For example, the gateway 13 may be added between the terminal device 12 and the first server 11.

In some embodiments, the gateway 13 is further configured to: receive the encrypted access request sent from the terminal device 12, the encrypted access request including first encrypted information and second encrypted information; decrypt the first encrypted information using the private key corresponding to the public key to obtain first information; and send the second encrypted information to the first server 11 according to the first information. The first server 11 is further configured to: receive the second encrypted information; decrypt the second encrypted information using the first key to obtain the second information. The first encrypted information is obtained by the terminal device 12 encrypting the first information in the access request using the public key; the second encrypted information is obtained by the terminal device 12 encrypting the second information in the access request using the first key.

As an implementation, when sending an access request to the first server 11, the terminal device 12 may encrypt part of the information in the access request using a first public key, for example, encrypt the first information in the access request using the first public key; then, encrypt the other part of the information in the access request using a first key, for example, encrypt the second information in the access request using the first key. Thus, it is possible to achieve double encryption of the communication between the terminal device 12 and the first server 11, so as to further improve the security of information transmission between the terminal device 12 and the first server 11. It will be noted that the encryption manner using the first public key may be referred to as a gateway encryption manner, and the encryption manner using the first key may be referred to as a platform policy encryption manner.

For example, the access request sent by the terminal device 12 to the first server 11 includes key information and business information. The key information includes, for example, the identification information of the terminal device 12, the access request sending time, the serial ID of the APP that needs to be accessed; the business information includes, for example, the specific request information sent by the terminal device 12 to the first server 11. For example, the first information includes the key information, and the second information includes the business information. The terminal device 12 encrypts the key information in the access request using the first public key and encrypts the business information using the first key, thereby further improving the security of information transmission between the terminal device 12 and the first server 11. Furthermore, the first public key is used to encrypt the key information with a small amount of information, and the first key is used to encrypt the business information with a large amount of information, which may also avoid the problem of low encryption efficiency caused by the encryption using the first public key, i.e., asymmetric encryption.

Figure 5:
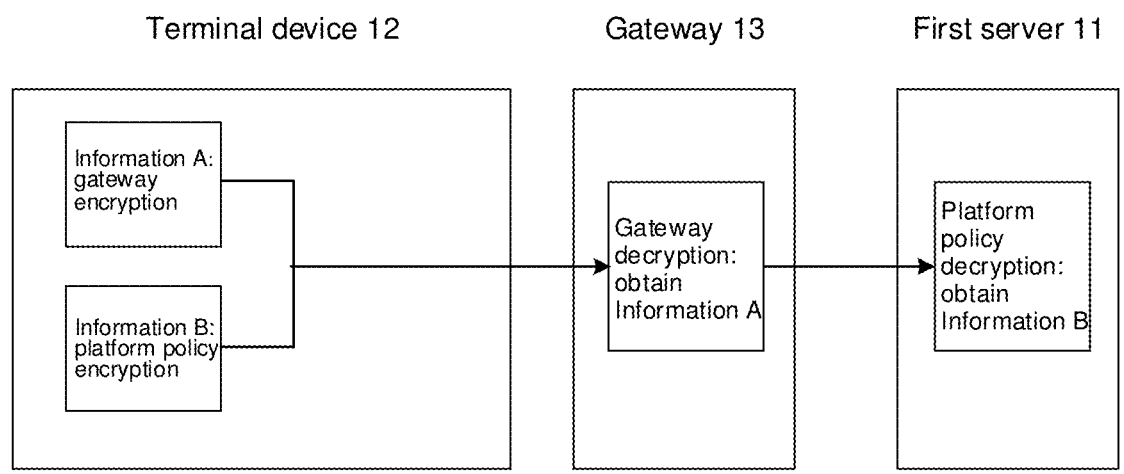
FIG. 5 is a schematic diagram of another security management system, in accordance with some embodiments.

As shown in FIG. 5, a gateway 13 is provided between the terminal device 12 and the first server 11. In a case where the business communication is carried out between the terminal device 12 and the first server 11, the access request sent by the terminal device 12 includes Information A (the key information) and Information B (the business information). The terminal device 12 performs the gateway encryption on Information A using the first public key, performs the platform policy encryption on Information B using the first key, and sends the encrypted access request to the gateway 13 first. After receiving the encrypted access request sent from the terminal device 12, the gateway 13 performs gateway decryption on the encrypted access request using the first private key corresponding to the first public key in gateway encryption to obtain Information A. Then, the gateway 13 forwards Information B to the corresponding first server 11 according to the APP serial ID in Information A. After receiving the encrypted Information B, the first server 11 performs platform policy decryption on the encrypted Information B using the first key to obtain Information B, i.e., obtain the specific content of the access request sent by the terminal device 12. The process of the first server 11 sending the access request to the terminal device 12 is also similar and will not be repeated here.

Figure 6:
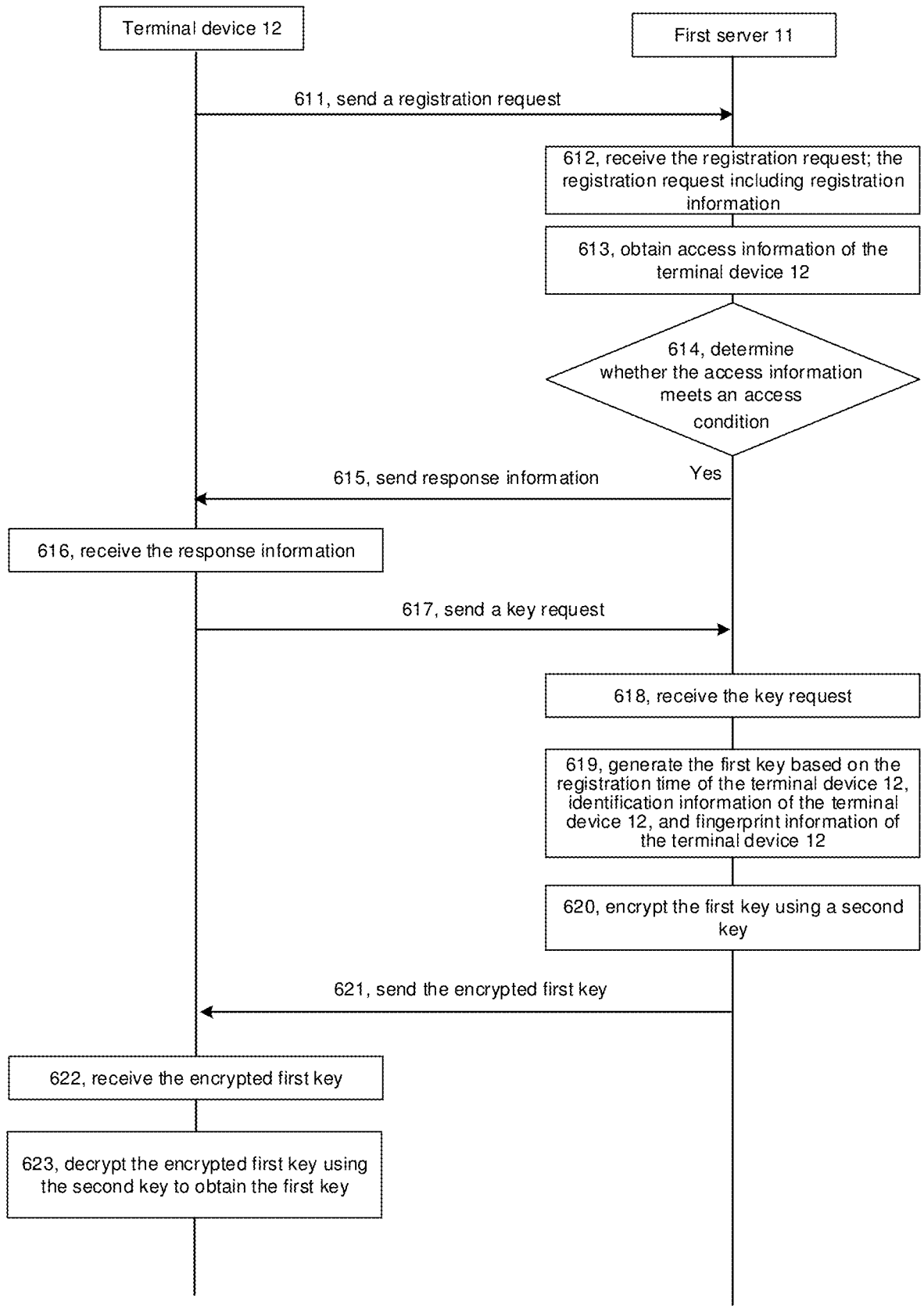
FIG. 6 is a flowchart of a security management method, in accordance with some embodiments.

FIG. 6 shows a security management method, in accordance with the embodiments of the present disclosure; as shown in FIG. 6, the security management method includes step 611 to step 623.

In step 611, a terminal device 12 sends a registration request to a first server 11.

In step 612, the first server 11 receives the registration request from the terminal device 12; the registration request includes registration information.

In step 613, the first server 11 obtains access information of the terminal device 12.

In step 614, it is determined that whether the access information of the terminal device 12 meets an access condition.

If yes, continue to perform step 615.

In step 615, the first server 11 sends response information to the terminal device 12.

The response information is used to indicate that the access information of the terminal device 12 meets the access condition.

In step 616, the terminal device 12 receives the response information sent by the first server 11.

In step 617, the terminal device 12 sends a key request to the first server 11.

The key request is used to request a first key; the registration time of the terminal device 12 is related to the time when the terminal device 12 sends the key request.

In step 618, the first server 11 receives the key request sent by the terminal device 12.

In step 619, the first server 11 generates the first key based on the registration time of the terminal device 12, identification information of the terminal device 12, and fingerprint information of the terminal device 12.

The fingerprint information is related to the time when the application is installed on the terminal device.

In step 620, the first server 11 encrypts the first key using a second key.

The first key is different from the second key. The second key is generated through a hash algorithm based on first salt information, the fingerprint information of the terminal device, and the registration time of the terminal device.

In step 621, the first server 11 sends the encrypted first key to the terminal device 12.

In step 622, the terminal device 12 receives the encrypted first key.

In step 623, the terminal device 12 decrypts the encrypted first key using the second key to obtain the first key.

In some embodiments, the security management method further includes: obtaining and storing, by the first server 11, the identification information and registration information of the terminal device 12. The identification information of the terminal device 12 includes the MAC address and/or IMEI of the terminal device 12, and the registration information of the terminal device 12 includes the fingerprint information of the terminal device 12. The access information of the terminal device 12 meeting the access condition includes: the registration information of the terminal device stored in the first server including fingerprint information that is the same as the fingerprint information in the access information of the terminal device.

In some embodiments, the security management method further includes: generating, by the terminal device 12, a third key through a hash algorithm based on the fingerprint information of the terminal device 12 and second salt information; encrypting, by the terminal device 12, the first key using the third key; and storing, by the terminal device 12, the encrypted first key.

In some embodiments, the security management method further includes: if applications are reinstalled on the terminal device 12 or an operation system of the terminal device 12 is reinstalled, resending, by the terminal device 12, the access information to the first server 11.

In some embodiments, the security management method further includes: generating, by the terminal device 12, the fingerprint information of the terminal device through the hash algorithm based on at least one of the identification information of the terminal device 12, hardware information of the terminal device 12, information of an application installed on the terminal device 12, or the time when the application is installed on the terminal device 12.

In some embodiments, the security management method further includes: adding, by the first server 11, the terminal device 12 to a blacklist in a case where the number of abnormal accesses of the terminal device 12 is greater than or equal to a threshold. The abnormal access includes that access information of the terminal device 12 does not meet the access condition.

Figure 7:
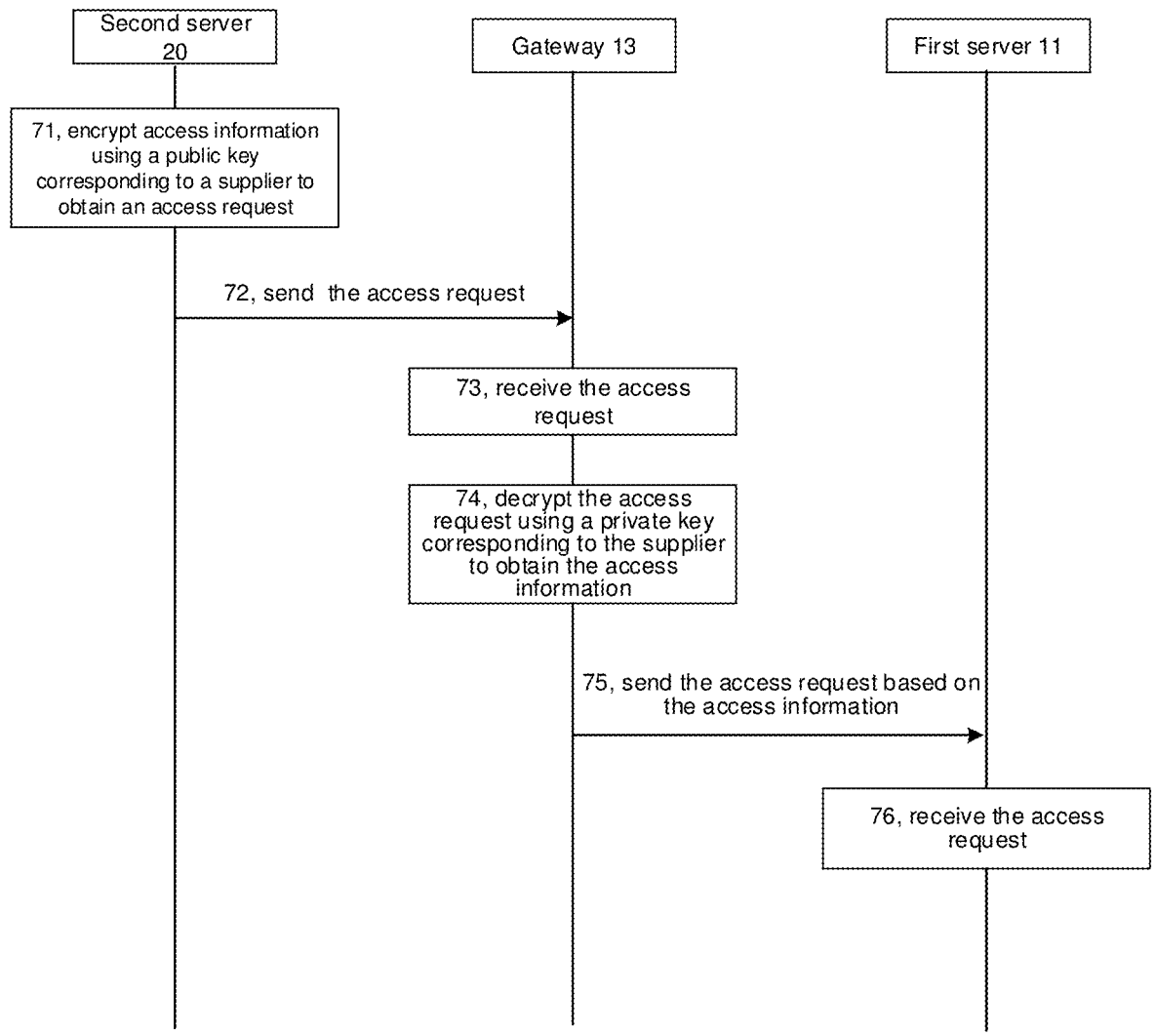
FIG. 7 is a flowchart of another security management method, in accordance with some embodiments.

FIG. 7 shows another security management method, in accordance with the embodiments of the present disclosure; as shown in FIG. 7, the security management method includes step 71 to step 76.

In step 71, a second server 20 encrypts access information using a public key corresponding to a supplier to obtain an access request.

The second server 20 is a server of the supplier, and the access information includes identification information of the second server 20 and the access request time.

In step 72, the second server 20 sends the access request to a gateway 13.

In step 73, the gateway 13 receives the access request.

In step 74, the gateway 13 decrypts the access request using a private key corresponding to the supplier to obtain the access information.

In step 75, the gateway 13 sends the access request to a first server 11 corresponding to the supplier based on the access information.

In step 76, the first server 11 receives the access request sent by the gateway 13.

In some embodiments, the security management method further includes: receiving, by the gateway 13, an encrypted access request sent from a terminal device 12, the encrypted access request including first encrypted information and second encrypted information; decrypting, by the gateway 13, the first encrypted information using a private key corresponding to the public key to obtain first information; sending, by the gateway 13, the second encrypted information to the first server according to the first information; and receiving, by the first server 11, the second encrypted information; and decrypting, by the first server 11, the second encrypted information using a first key to obtain second information. The first encrypted information is obtained by the terminal device 12 encrypting the first information in the access request using the public key; the second encrypted information is obtained by the terminal device 12 encrypting the second information in the access request using the first key.

Some embodiments of the present disclosure provide a computer-readable storage medium (e.g., a non-transitory computer-readable storage medium), the computer-readable storage medium has stored computer program instructions thereon, and the computer program instructions, when executed on a computer (e.g., a security management system), cause the computer to perform the security management method according to any of the above embodiments.

For example, the computer-readable storage medium may include, but is not limited to, a magnetic storage device (e.g., a hard disk, a floppy disk or a magnetic tape), an optical disk ((e.g., a compact disk (CD), or a digital versatile disk (DVD)), a smart card and a flash memory device (e.g., an erasable programmable read-only memory (EPROM), a card, a stick or a key driver). Various computer-readable storage media described in the present disclosure may represent one or more devices and/or other machine-readable storage medium for storing information. The term "computer-readable storage medium" may include, but is not limited to, wireless channels and various other media capable of storing, containing and/or carrying instructions and/or data.

Some embodiments of the present disclosure provide a computer program product, which is stored on, for example, a non-transitory computer-readable storage medium. The computer program product includes computer program instructions, and the computer program instructions, when executed on a computer (e.g., a security management system), cause the computer to perform the security management method according to the above embodiments.

Some embodiments of the present disclosure provide a computer program. When executed on a computer (e.g., a security management system), the computer program causes the computer to perform the security management method as described in the above embodiments.

Beneficial effects of the computer-readable storage medium, the computer program product and the computer program are the same as the beneficial effects of the security management method as described in the above embodiments, and details will not be repeated here.

The above are only specific embodiments of the present disclosure, but the scope of protection of the present disclosure is not limited thereto, and any person skilled in the art may conceive of variations or replacements within the technical scope of the present disclosure, which shall fall within the protection scope of the present disclosure. Therefore, the protection scope of the present disclosure should be determined by the protection scope of the claims.

What is claimed is:

1. A security management system, comprising:
a first server configured to:
obtain access information of a terminal device;
generate, if the access information of the terminal device meets an access condition, a first key based on a registration time of the terminal device, identification information of the terminal device and fingerprint information of the terminal device; wherein the fingerprint information is related to a time when an application is installed on the terminal device;
encrypt the first key using a second key to obtain an encrypted first key, the first key being different from the second key; and
send the encrypted first key to the terminal device, so that the terminal device decrypts the encrypted first key using the second key; and
a gateway configured to:
receive an access request from a second server, wherein the second server is a server of a supplier, the access request includes access information, the access information is encrypted by the second server using a public key corresponding to the supplier, and the access information includes identification information of the second server and an access request time;
decrypt the access request using a private key corresponding to the supplier to obtain the access information; and
send the access request to the first server corresponding to the supplier based on the access information; wherein the access information further includes an application serial number of an application service provided by the supplier through the second server, and the application service is deployed on the first server; the first server corresponding to the supplier is determined based on the application serial number.

2. The security management system according to claim 1, wherein
the gateway is further configured to: receive an encrypted access request sent from the terminal device, the encrypted access request including first encrypted information and second encrypted information; decrypt the first encrypted information using a private key corresponding to the public key to obtain first information; and send the second encrypted information to the first server based on the first information;
wherein the first encrypted information is obtained by the terminal device encrypting the first information in the access request using the public key, and the second encrypted information is obtained by the terminal device encrypting second information in the access request using the first key;
the first server is further configured to: receive the second encrypted information; and decrypt the second encrypted information using the first key to obtain the second information.

3. The security management system according to claim 1, wherein the first server is further configured to:
obtain and store the identification information and registration information of the terminal device; wherein the identification information of the terminal device includes a media access control address and/or an international mobile equipment identity of the terminal device, and the registration information of the terminal device includes the fingerprint information of the terminal device;
wherein the access information of the terminal device meeting the access condition includes: registration information of at least one terminal device stored in the first server including fingerprint information that is the same as the fingerprint information in the access information of the terminal device.

4. The security management system according to claim 1, wherein the first server is further configured to:
send response information to the terminal device, the response information being used to indicate that the access information of the terminal device meets the access condition; and
receive a key request from the terminal device, the key request being used to request the first key; wherein the registration time of the terminal device is related to a time when the terminal device sends the key request.

5. The security management system according to claim 1, further comprising:
the terminal device configured to:
send the access information to the first server; and
receive the encrypted first key; and decrypt the encrypted first key using the second key to obtain the first key;
wherein the second key is generated through a hash algorithm based on first salt information, the fingerprint information of the terminal device, and the registration time of the terminal device.

6. The security management system according to claim 5, wherein the terminal device is further configured to:
resend, if the application is reinstalled on the terminal device or an operation system of the terminal device is reinstalled, the access information to the first server.

7. The security management system according to claim 5, wherein the terminal device is further configured to:
generate a third key through a hash algorithm based on the fingerprint information and second salt information of the terminal device; and
encrypt the first key using the third key; and store the encrypted first key.

8. The security management system according to claim 1, wherein the terminal device is configured to:
generate the fingerprint information of the terminal device through a hash algorithm based on at least one of the identification information of the terminal device, hardware information of the terminal device, information of the application installed on the terminal device, and the time when the application is installed on the terminal device.

9. The security management system according to claim 1, wherein the first server is further configured to:
add, in a case where a number of abnormal accesses of the terminal device is greater than or equal to a threshold, the terminal device to a blacklist; wherein an abnormal access includes that the access information of the terminal device does not meet the access condition.

10. A security management method, comprising:
obtaining, by a first server, access information of a terminal device;
generating, by the first server, a first key based on a registration time of the terminal device, identification information of the terminal device, and fingerprint information of the terminal device if the access information of the terminal device meets an access condition; wherein the fingerprint information is related to a time when an application is installed on the terminal device;
encrypting, by the first server, the first key using a second key to obtain an encrypted first key, the first key being different from the second key; and sending, by the first server, the encrypted first key to the terminal device, so that the terminal device decrypts the encrypted first key using the second key; and the method further comprising:

receiving, by a gateway, an access request from a second server; wherein the second server is a server of a supplier, the access request includes access information, the access information is encrypted by the second server using a public key corresponding to the supplier, and the access information includes identification information of the second server and an access request time;

decrypting, by the gateway, the access request using a private key corresponding to the supplier to obtain the access information; and sending, by the gateway, the access request to the first server corresponding to the supplier based on the access information; wherein the access information further includes an application serial number of an application service provided by the supplier through the second server, and the application service is deployed on the first server; the first server corresponding to the supplier is determined based on the application serial number.

11. The security management method according to claim 10, further comprising:

receiving, by the gateway, an encrypted access request sent from the terminal device, the encrypted access request including first encrypted information and second encrypted information;

decrypting, by the gateway, the first encrypted information using a private key corresponding to the public key to obtain first information;

sending, by the gateway, the second encrypted information to the first server based on the first information;

receiving, by the first server, the second encrypted information; and decrypting, by the first server, the second encrypted information using the first key to obtain second information;

wherein the first encrypted information is obtained by the terminal device encrypting the first information in the access request using the public key, and the second encrypted information is obtained by the terminal device encrypting the second information in the access request using the first key.

12. The security management method according to claim 10, further comprising:

obtaining and storing, by the first server, the identification information and registration information of the terminal device; the identification information of the terminal device including a media access control address and/or an international mobile equipment identity of the terminal device, and the registration information of the terminal device including the fingerprint information of the terminal device;

wherein the access information of the terminal device meeting the access condition includes: registration information of at least one terminal device stored in the first server including fingerprint information that is the same as the fingerprint information in the access information of the terminal device.

13. The security management method according to claim 10, further comprising:

sending, by the first server, response information to the terminal device; the response information being used to indicate that the access information of the terminal device meets the access condition; and receiving, by the first server, a key request from the terminal device, the key request being used to request the first key; wherein the registration time of the terminal device is related to a time when the terminal device sends the key request.

14. The security management method according to claim 10, further comprising:

sending, by the terminal device, the access information to the first server;

receiving, by the terminal device, the encrypted first key; and decrypting, by the terminal device, the encrypted first key using the second key to obtain the first key;

wherein the second key is generated through a hash algorithm based on first salt information, the fingerprint information of the terminal device, and the registration time of the terminal device.

15. The security management method according to claim 14, further comprising:

resending, by the terminal device, the access information to the first server if the application is reinstalled on the terminal device or an operation system of the terminal device is reinstalled.

16. The security management method according to claim 14, further comprising:

generating, by the terminal device, a third key through a hash algorithm based on the fingerprint information and second salt information of the terminal device;

encrypting, by the terminal device, the first key using the third key; and storing, by the terminal device, the encrypted first key.

17. The security management method according to claim 10, further comprising:

generating, by the terminal device, the fingerprint information of the terminal device through a hash algorithm based on at last one of the identification information of the terminal device, hardware information of the terminal device, information of the application installed on the terminal device, or the time when the application is installed on the terminal device.

18. A non-transitory computer-readable storage medium storing computer program instructions, when executed on a security management system, implement the security management method according to claim 10.

* * * * *